United States Patent [19]

Montgomery

[11] Patent Number: 5,410,360
[45] Date of Patent: Apr. 25, 1995

[54] TIMING CONTROL FOR INJECTING A BURST AND DATA INTO A VIDEO SIGNAL

[75] Inventor: Gerald D. Montgomery, Mesa, Ariz.

[73] Assignee: WavePhore, Inc., Tempe, Ariz.

[21] Appl. No.: 76,137

[22] Filed: Jun. 14, 1993

Related U.S. Application Data

[63] Continuation-in-part of Ser. No. 947,134, Sep. 18, 1992, which is a continuation-in-part of Ser. No. 715,920, Jun. 14, 1991, Pat. No. 5,327,237.

[51] Int. Cl.$^6$ .............. H04N 7/08; H04N 7/00; H04N 11/00
[52] U.S. Cl. .................. 348/473; 348/486; 348/536; 348/500; 348/505; 348/432
[58] Field of Search ............ 358/142, 141, 12, 13, 358/19, 15, 148, 149, 150; 348/486, 475, 474, 473, 476, 471, 472, 470, 469, 436, 434, 433, 432, 426, 461, 465, 467, 464, 460, 495, 496, 505, 506, 507, 385, 386, 536, 537, 500, 508, 512, 520; H04N 7/08, 7/00, 11/00

[56] References Cited

U.S. PATENT DOCUMENTS

| | | | |
|---|---|---|---|
| 2,838,597 | 6/1958 | De Vrijer | 178/5.2 |
| 3,529,081 | 9/1970 | Rider | 178/5.6 |
| 3,543,169 | 11/1970 | Hill | 358/171 |
| 3,632,863 | 1/1972 | Hirashima et al. | 348/473 |
| 3,679,816 | 7/1972 | Avins et al. | 358/19 |
| 3,700,793 | 10/1972 | Borsuk et al. | 178/6.8 |
| 3,726,992 | 4/1973 | Eguchi et al. | 348/461 |
| 3,845,326 | 10/1974 | Godden | 307/230 |
| 3,925,639 | 12/1975 | Hester | 235/61.11 E |
| 3,927,250 | 12/1975 | Rainger | 178/5.6 |
| 4,051,532 | 9/1977 | Hilbert et al. | 358/142 |
| 4,065,784 | 12/1977 | Rossi | 348/382 |
| 4,074,199 | 2/1978 | de Jager et al. | 325/50 |
| 4,155,039 | 5/1979 | Lechevin | 325/20 |
| 4,177,405 | 12/1979 | Chapdelaine | 315/159 |
| 4,183,054 | 1/1980 | Patisaul et al. | 358/86 |
| 4,208,630 | 6/1980 | Martinez | 375/7 |
| 4,209,748 | 6/1980 | Weber | 455/47 |
| 4,231,114 | 10/1980 | Dolikian | 455/49 |
| 4,354,200 | 10/1982 | Haenen et al. | 358/23 |

(List continued on next page.)

FOREIGN PATENT DOCUMENTS

| | | | |
|---|---|---|---|
| 0156709 | 10/1985 | European Pat. Off. | 358/142 |
| 0246698 | 11/1987 | European Pat. Off. | H04N 9/64 |
| 0263449 | 4/1988 | European Pat. Off. | H04N 1/00 |
| 0278192 | 8/1988 | European Pat. Off. | H04N 7/08 |
| 0356903 | 3/1990 | European Pat. Off. | H04N 7/04 |
| 0360615 | 3/1990 | European Pat. Off. | H04N 7/08 |

(List continued on next page.)

OTHER PUBLICATIONS

GENESYS: Transmission System for HDTV.
Tomas:, Wayne, *Electronic Communications Systems*, Prentice Hall, p. 481.
King, Patrick T., *A Novel Television Add-On Data Communication System*, Journal of the SMPTE, vol. 83, Jan. 1974, pp. 10–13.
Maebara, Akiyoski and Seizo Tamai, *A Television Facsimile System Employing an Additional Carrier*, New (List continued on next page.)

Primary Examiner—James J. Groody
Assistant Examiner—Safet Metjahic
Attorney, Agent, or Firm—Spensley Horn Jubas & Lubitz

[57] ABSTRACT

A secondary signal is processed and injected into a primary color video signal. The timing of the subsequent transmission of the secondary signal is controlled by timing signals. The timing signals also control the transmission of a carrier burst prior to the transmission of the secondary data signal. This carrier burst is used by a receiver to synchronize with the transmitter, reduce transmission errors and to indicate that a data transmission is to follow.

23 Claims, 4 Drawing Sheets

5,410,360

Page 2

U.S. PATENT DOCUMENTS

| | | | |
|---|---|---|---|
| 4,379,947 | 4/1983 | Warner | 179/1 GD |
| 4,424,593 | 1/1984 | Kahn | 455/47 |
| 4,479,226 | 10/1984 | Prabhu et al. | 375/1 |
| 4,513,415 | 4/1985 | Martinez | 370/92 |
| 4,538,174 | 8/1985 | Gargini et al. | 358/86 |
| 4,539,707 | 9/1985 | Jacobs et al. | 455/47 |
| 4,551,754 | 11/1985 | Meise et al. | 358/180 |
| 4,556,973 | 12/1985 | Uemura | 370/69.1 |
| 4,578,815 | 3/1986 | Persinotti | 455/15 |
| 4,586,078 | 4/1986 | Citta et al. | 358/86 |
| 4,591,906 | 5/1986 | Morales-Garza et al. | 358/84 |
| 4,602,279 | 7/1986 | Freeman | 358/86 |
| 4,622,694 | 11/1986 | Weber et al. | 455/47 |
| 4,626,913 | 12/1986 | Gurumurthy | 358/142 |
| 4,647,983 | 3/1987 | Ota | 358/310 |
| 4,665,431 | 5/1987 | Cooper | 358/145 |
| 4,688,097 | 8/1987 | Lin | 380/15 |
| 4,745,476 | 5/1988 | Hirashima | 358/145 |
| 4,750,036 | 6/1988 | Martinez | 358/147 |
| 4,750,206 | 6/1988 | Schotz | 381/4 |
| 4,800,428 | 1/1989 | Johanndeiter et al. | 358/142 |
| 4,805,020 | 2/1989 | Greenberg | 358/142 |
| 4,807,031 | 2/1989 | Broughton et al. | 358/142 |
| 4,855,811 | 8/1989 | Isuardi | 348/433 |
| 4,879,606 | 11/1989 | Walter et al. | 358/330 |
| 4,884,139 | 11/1989 | Pommier | 358/142 |
| 4,958,230 | 9/1990 | Jonnalagadda et al. | 358/186 |
| 4,969,041 | 11/1990 | O'Grady et al. | 358/142 |
| 4,985,769 | 1/1991 | Yasumoto et al. | 358/141 |
| 5,014,125 | 5/1991 | Pocock et al. | 358/86 |
| 5,057,920 | 10/1991 | Wilkinson | 358/171 |
| 5,063,446 | 11/1991 | Gibson | 358/142 |
| 5,075,773 | 12/1991 | Pullen et al. | 358/141 |
| 5,103,297 | 4/1992 | Yamade | 358/31 |
| 5,142,354 | 8/1992 | Suzuki et al. | 358/34 |
| 5,157,359 | 10/1992 | Nogami et al. | 332/117 |
| 5,177,604 | 1/1993 | Martinez | 358/86 |
| 5,200,822 | 4/1993 | Bronfin | 358/142 |
| 5,243,423 | 9/1993 | De Jean et al. | 358/142 |
| 5,327,237 | 7/1994 | Gerdes et al. | 348/476 |

FOREIGN PATENT DOCUMENTS

| | | | |
|---|---|---|---|
| 0365431 | 4/1990 | European Pat. Off. | H04N 5/02 |
| 62-092084 | 5/1986 | Japan | H04N 7/08 |
| 0206990 | 9/1987 | Japan | H04N 11/020 |
| 62-236288 | 10/1987 | Japan | H04N 7/08 |
| 1-089886 | 4/1989 | Japan | H04N 9/79 |
| 3-148979 | 6/1991 | Japan | H04N 7/12 |
| 92022984 | 12/1992 | WIPO | H04N 7/08 |

OTHER PUBLICATIONS

Broadcasting System Research Group, Ser. No. 151, Feb. 1972.

Christiansen, M.; T. Roste; and J. N. Skålvik, *A Video Scrambler/Descrambler Concept for the PAL Format*, Journal of the Institution of Electronic and Radio Engineers, vol. 57, No. 1, Jan./Feb. 1987, pp. 27–35.

Gerdes, Richard, "Using Genesys TM HDTV Technologies for Today's Expanded NTSC Service". Presented at 1990 Spring Engineering Conference, National Association of Broadcasters, Apr. 1, 1990, Atlanta, Ga.

Gerdes, Richard, "Waveform Modulation as Used in Television Applications". Presented at RF Technology Expo 90, Mar. 28, 1990, Anaheim, Calif.

Gerdes, Richard, "Genesys TM HDTV Technologies Expand Existing NTSC Service". Presented at the 24th Annual SMPTE Television Conference, Society of Motion Picture and Television Engineers, Jan. 1990, Lake Buena Vista, Fla.

Gerdes, Richard, "Arizona Based HDTV: The Genesys TM Technologies." Presented at Phoenix Chapter of the Society of Broadcast Engineers, Arizona Broadcasters Association Fall Meeting, Nov. 10, 1989, Phoenix, Ariz.

Gerdes, Richard, "HDTV Management Timetable." Presented at Challenges in Teleproduction, The International Teleproduction Society Annual Forum, Sep. 17, 1989, Los Angeles, Calif.

Gerdes, Richard, "The Use of Genesys TM Technology for HDTV". Presented at the 130th SMPTE Technical Conference, Society of Motion Picture and Television Engineers, Inc., Oct. 15–19, 1988, New York, N.Y.

King, Patrick T., "A Novel TV Add–On Data Communication System," I.E.E.E. Transactions on Broadcast and Television, vol. BTR–19, No. 4, pp. 225–230; Nov. 1973.

TIMING CONTROL FOR INJECTING A BURST AND DATA INTO A VIDEO SIGNAL

RELATED APPLICATIONS

This application is a Continuation-In-Part of U.S. patent application Ser. No. 07/947,134, filed Sep. 18, 1992, which is a Continuation-In-Part of U.S. patent application Ser. No. 07/715,920, now U.S. Pat. No. 5,327,237, filed on Jun. 14, 1991. This application is also related to the following applications assigned to Wave-Phore, Inc. and filed on the same day as this application: my U.S. patent application Ser. No. 08/076,199, entitled Dynamic Injection Level Control; my U.S. patent application Ser. No. 08/076,196, entitled D.C. Level Restore Circuit For A Modulator; and my U.S. patent application Ser. No. 08/075,888, entitled Filter By-Pass For Transmitting An Additional Signal With A Video Signal.

BACKGROUND OF THE INVENTION

1. Field of the Invention

This invention relates to transmitting a secondary signal with a primary video signal, and more particularly to timing signals to control when the secondary signal is transmitted.

2. Description of the Prior Art

It has been realized for a long time that the video spectrum in common commercial formats, such as NTSC, PAL, and SECAM, is not efficiently used. To overcome this inefficiency, several different video spectrum formats have been proposed. However, these formats, such as Japanese HDTV, cannot be received by the conventional television receivers in common use.

Another approach to efficiently using the spectrum of a video signal, of common formats, is to time multiplex the video signal with a secondary signal. This approach is used for transmitting close captioned information with the video signal. In particular, the close captioned information is transmitted during the vertical blanking intervals. A specially designed receiver may receive and display close captioned information, while commonly available commercial receivers may display the transmitted signal without any perceptible visual defects in the image from the closed captioned information. However, the data transmission rate is low, thus, limiting the amount of information that may be transmitted.

Another method, is to place a secondary signal in the 2-3 Mhz range, which lies between the peak values of the Chrominance and Luminance carriers. An example of this is shown in "A Novel Television Add-On Data Communication System", by Patrick T. King in Vol. 33 of Journal of the SMPTE (January 1974). The method uses odd multiples of one half the scanning rate, which results in the spectral energy of the secondary signal overlapping with the chrominance information. This requires that the transmitted data rate of the secondary signal must remain low (i.e., under 21 kilobits per second) and the secondary signal must be transmitted at low power to avoid interference with the chrominance carrier.

A drawback to all of these approaches is that a secondary signal cannot be transmitted at high data rates without causing interference with the primary video signal. This limits both the amount of data and the type of data which may be sent.

The lower data rates used in these approaches requires a careful balancing of data transmission needs against the need to reduce transmission errors. Any error reduction methods such as error correction coding reduce transmission data rates.

Further, most current transmitting stations switch between different primary video signals, for example between a primary television program and a variety of commercials. This can cause problems in synchronization and can increase transmission errors. Thus, it becomes extremely important to utilize error reduction techniques, even though this will reduce the data transmission capability of the secondary signal transmitter.

SUMMARY OF THE INVENTION

Therefore, it is a first object of this invention to provide a system providing a more efficient use of the video spectrum in common commercial formats. It is a second object of this invention to provide for more efficient use of the video spectrum without interfering with the transmission of the underlying video signal. It is a still further object of the invention to permit synchronization and the reduction in transmission errors for a secondary signal, while allowing high data transmission rates.

These and other objects are achieved through the use of timing signals to control a carrier burst and a subsequent transmission of secondary signal injected into a primary color video signal. In an embodiment of the present invention, a processor is used to combine a primary color video signal with a secondary signal for subsequent transmission. The processor includes a secondary signal section, which uses a secondary signal carrier at a predetermined frequency to provide a carrier burst and to produce a modulated rasterized version of the secondary signal. Along with the secondary signal section is a timing section which generates timing signals to control when the carrier burst of the secondary signal carrier is transmitted. The carrier burst is injected and transmitted with the primary video signal prior to injection of the secondary signal into the primary video signal. The processor also includes a primary signal section which provides the primary video signal. The carrier burst is used by a receiver to synchronize the secondary signal, reduce transmission errors, and to indicate that a data transmission will follow.

According to the illustrative embodiment of the present invention, the processor provides the primary color video signal with horizontal blanking periods and the timing section causes the carrier burst to be transmitted just before or after this horizontal blanking period. In the preferred embodiment, the timing section causes the carrier burst to be transmitted after a back porch portion of the horizontal blanking period. In the embodiment of the present invention, the secondary signal is injected into the primary video signal at a non-integral, odd quarter multiple of a horizontal scanning frequency of the primary color video signal.

In a still further embodiment of the present invention, a processor is used in a receiver for receiving a composite video signal, which is separated into a primary color video signal and a secondary signal. The processor includes a secondary signal section which receives the secondary signal in the composite video signal, detects the carrier burst, and provides the demodulated unrasterized version of the secondary signal after a detection of the carrier burst. Along with the secondary signal section is a timing section for controlling the detection of the carrier burst of the secondary signal carrier, so that the secondary signal section is synchronized with the secondary signal carrier and can provide the secondary signal with essentially no errors. The processor may include a primary signal section which receives the composite video signal for display on a picture tube or recording on a video tape recorder.

Other features and advantages of the invention will become apparent from the following detailed description, taken in conjunction with the accompanying drawings, which illustrate, by way of example, various features of embodiments of the invention.

DETAILED DESCRIPTION OF THE EMBODIMENTS

Figure 1:
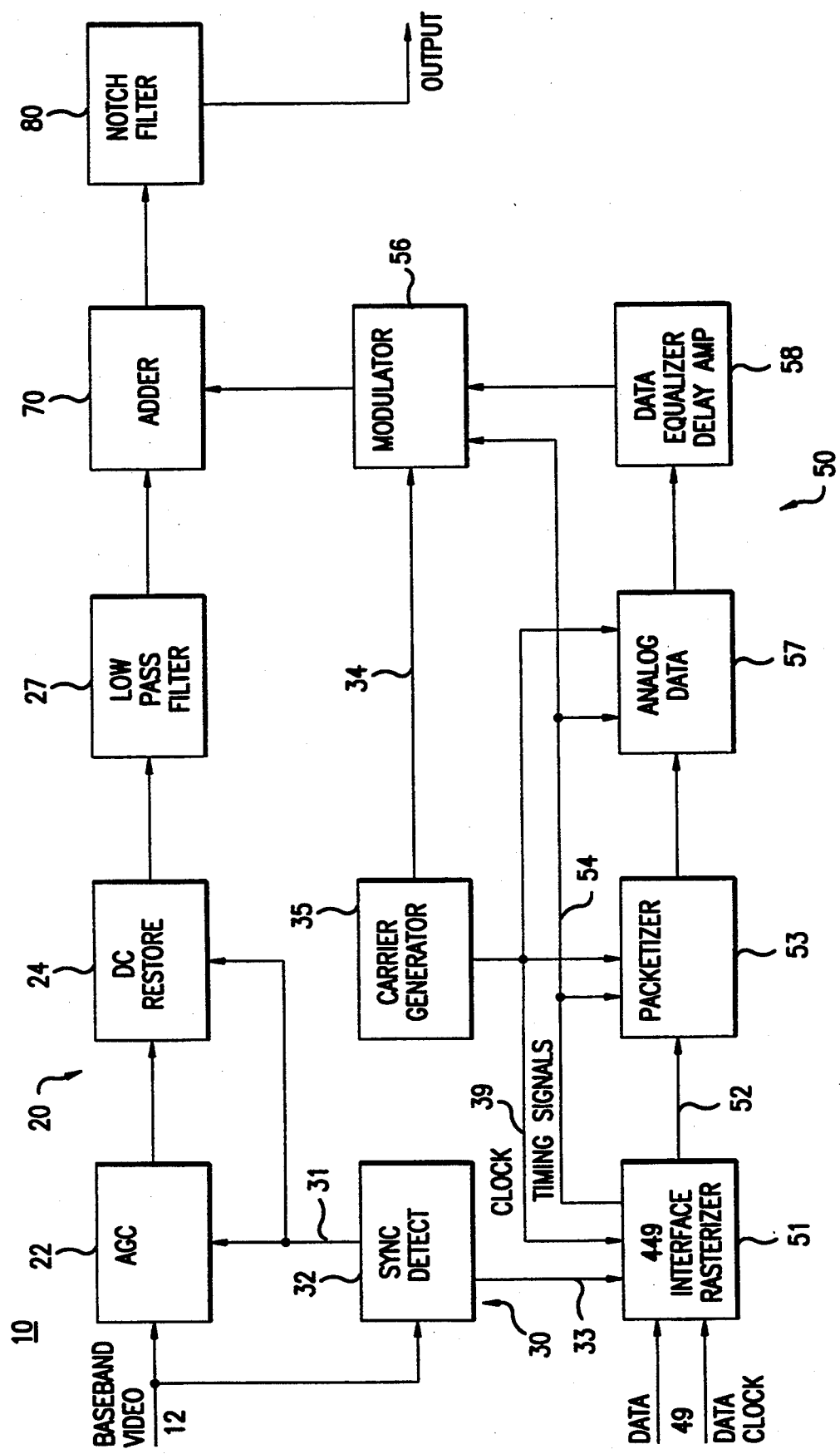
FIG. 1. is a block diagram for a signal processor incorporating an embodiment of the present invention for use in a transmitter.

As shown in the drawings for purposes of illustration, an embodiment of the present invention comprises a processor for generating timing signals and a carrier burst to help synchronize the secondary signal and reduce transmission errors in the secondary signal. An embodiment of a processor 10 is shown in FIG. 1. The processor 10 is for use in a transmitter and may be coupled to a network or other receiving devices.

In the embodiment of the present invention, the processor 10 transmits a primary NTSC color video signal 12 that has been combined with a secondary signal 49. The processor 10 includes a carrier generator 35 to generate a secondary signal carrier 34 which is modulated by the data for injection during the active video portion. When the carrier is not modulated, it can be used as a carrier burst. Transmission of the carrier burst is controlled by timing signals 54 from a timing section 30. This carrier burst is typically injected into the primary color video signal 12 and transmitted immediately after the end of a horizontal blanking period in the active video interval of the primary color video signal 12. The carrier burst is for use by a receiver (such as shown at 100 in FIG. 2) to provide synchronization in the reception of the secondary signal 49.

Figure 3:
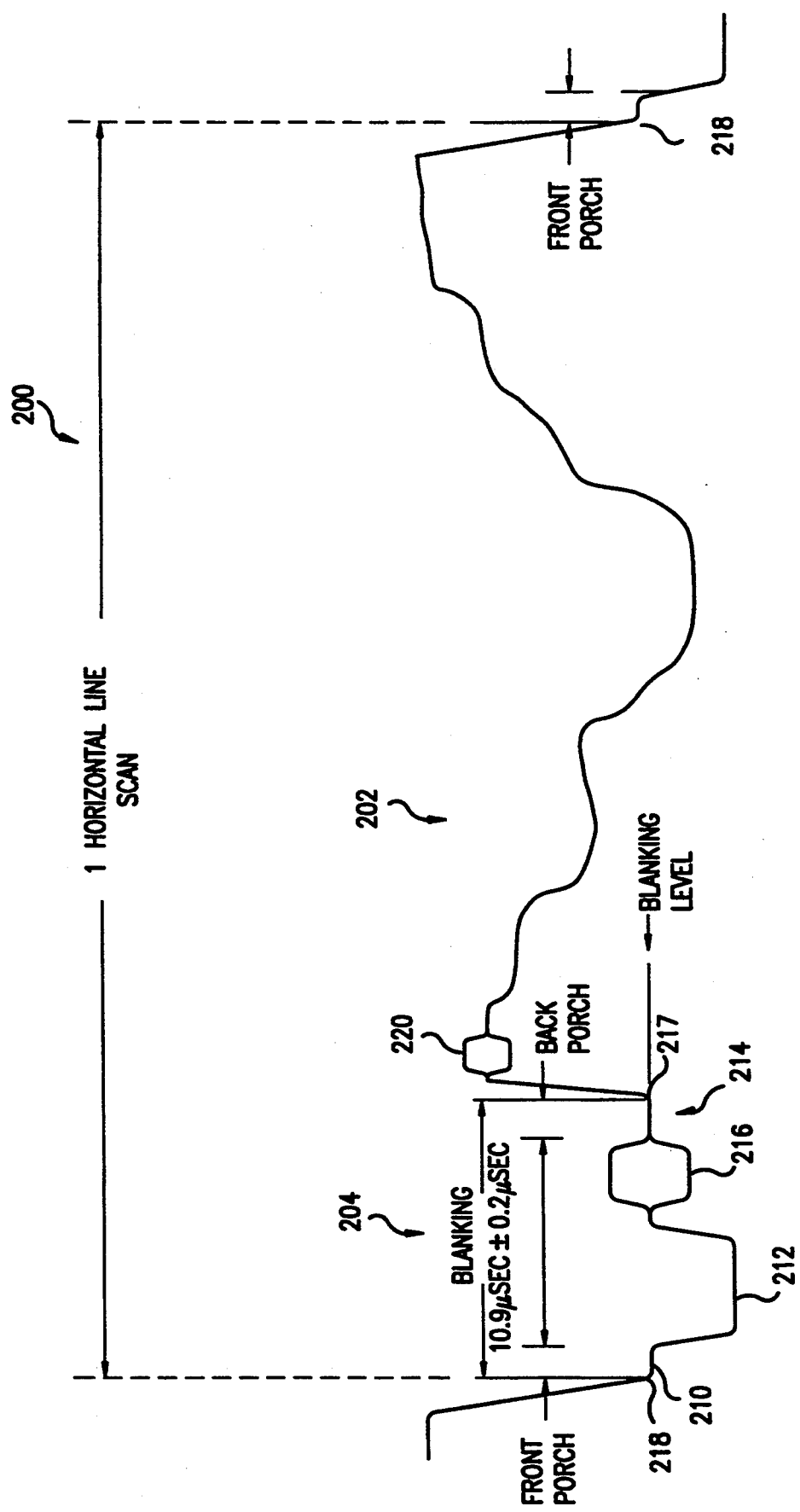
FIG. 3. is a representation of a composite positive transmission NTSC color video signal with the data signal injected according to an embodiment of the present invention.

The signal processor embodiment of FIG. 1 is virtually identical to the transmitter signal processor embodiment in FIG. 3 of U.S. patent application Ser. No. 07/947,134 to Montgomery et al. filed Sep. 18, 1992, and the description of that embodiment on pages 17 through 23 is incorporated herein by reference. In the embodiment of FIG. 1, the secondary data signal 49 is controlled by the timing section 30 and output by data section 50 where it is injected into the output of the primary video section 20 at the adder 70.

In this embodiment of the present invention, the processor 10 passes the primary color video signal 12 through the primary video section 20, which essentially eliminates all spectral energy above 3.7 Mhz. After which, the primary signal is sent to the adder 70 where it is combined with the output of the data section 50.

In FIG. 1, the 449 interface/rasterizer 51 uses a composite video sync signal 33 to generate the timing signals 54 that control a packetizer 53, an analog data converter 57 and a modulator 56. The interface/rasterizer 51, which may have an IEEE RS449 interface, receives the incoming data signal and the data clock, the composite sync signal 33 and the clock signal 39. The interface/rasterizer 51 has a first in first out buffer where data is clocked in by the data clock and clocked out under control of the clock 39 and the composite sync signal 33 denoting the timing of both horizontal and vertical blanking intervals in the video signal. Preferably to include a synchronization marker in each line, the data output 52 of the buffer in the interface/rasterizer 51 is clocked out at a rate sufficiently low so that blanking intervals and a synchronizer marker may be inserted into the output data stream of the data section 50. The interface/rasterizer 51 also provides timing signals 54 to the packetizer 53, the analog data converter 57 and the modulator 56.

The packetizer 53 packetizes bit packages of the rasterized data 52 into packets after encoding the data 52 to randomize that data. Randomizing techniques such as providing the data 52 to a five bit shift serial register where the third and fifth bit of the register are exclusive OR'ed with the input data bit may be used. Any other randomizing technique that prevents discernable patterns from appearing on the video screen of a television receiver may be used. Unique start codes are added to the beginning of each packet and CRC or other error correction codes may also be included at the end of a packet. Although it is not necessary, unique stop codes may be included at the end of a packet. Each packet contains preferably about one thousand bits including all start codes and error correction coding.

The output of the packetizer 53 is provided to the analog data converter 57 that serves to band limit the output of the packetizer. This analog data circuit 57 provides an analog data bit comprised of a positive, rounded (band limited) pulse for each one (1) in the input data stream and a negative, rounded (band limited) pulse for each zero (0) in the data stream. Other coding schema for higher data rates such as quadrature amplitude modulation may also be used.

The output of the analog data circuit 57 is supplied to a data equalizer and delay amplifier 58 in response to the timing control signals 54 so that the analog data bit will be synchronously modulated by the data carrier that controls the peak output level of the output of a modulator 56. The equalizer and delay amplifier 58 alters the phase of the output of the analog data circuit 57 to compensate for phase distortion caused by the audio notch filter 80. The modulator 56 uses the timing signals 54 to pass an unmodulated carrier burst and to modulate the rasterized, packetized analog version of the secondary signal 49 prior to injection into the primary signal 12.

The 449 interface/rasterizer 51 also rasterizes the secondary data signal 49 and provides the rasterized data to the packetizer 53 for packetizing. The data packets are then converted into a band limited signal by the analog data converter 57. A data equalizer and delay amplifier 58 alters the phase of the band limited signal to compensate for phase distortion which is introduced later by a notch filter 80 and the communications media. The phase altered secondary signal is provided to the modulator 56 to modulate the carrier 34, and the modulated signal is then provided to the adder 70 where it is injected into the primary video signal to form a composite video signal.

Before transmission, the composite video signal is passed though a notch filter 80 having a stop band at the audio portion frequency range, afterwhich the composite signal can be combined with the audio portion and subsequently transmitted. The carrier burst is transmitted prior to the transmission of the composite video signal containing the modulated and rasterized secondary signal 49.

In the embodiment of the present invention, the secondary signal 49 is preferably frequency interleaved at a non-integral, odd quarter multiple of the scanning frequency. Typically, the secondary signal carrier is set to 4.197 Mhz. This places the secondary signal 49 above the modulated chrominance carrier at 3.7 Mhz. Keeping the standard format allows for transmission of the secondary signal without observable interference on common commercially available receivers which are not designed to decode the secondary signal.

FIG. 3 provides a graphical representation of a scan of a single horizontal line 200 in a positive transmission NTSC color format, for use in the present invention where a carrier burst 220 may be transmitted. A typical horizontal line for the primary video signal 12 is comprised of an active video portion 202 preceded by a horizontal blanking interval 204. The active portion 202 of the primary video signal is preferably in accordance with the EIA RS 170A and includes a blanking interval 204. The blanking interval 204 is comprised of three main sections: a front porch 210, a horizontal sync pulse 212, and a back porch 214. During the back porch 214, a color burst 216 of the color subcarrier is generated to facilitate frequency and phase synchronization of the chrominance information by the receiver. The color burst 216 is completed before a back porch end 217. The active video portion 202 begins at the back porch end 217 and ends at the start of the next front porch 218.

In the present invention, the secondary signal carrier burst 220 may be transmitted after the back porch 214 and the beginning of the active video portion 202. To maximize transmission time the carrier burst should be as close to the back porch 214 as possible, but the carrier burst 220 should not occur during the back porch 214 of the blanking interval 204. In the preferred embodiment, the carrier burst 220 lasts for at least five cycles of a 4.197 Mhz secondary signal carrier or about 1.2 μs. However, other time durations and number of cycles for the carrier burst may be used.

It should be noted that the carrier burst 220 may be transmitted before the front porch 210 of the blanking period 204 at the end of the prior active portion 202. However, this is less desirable since the tendency towards desynchronization and resultant errors increases as the carrier burst and the data transmission become further apart.

Figure 4:
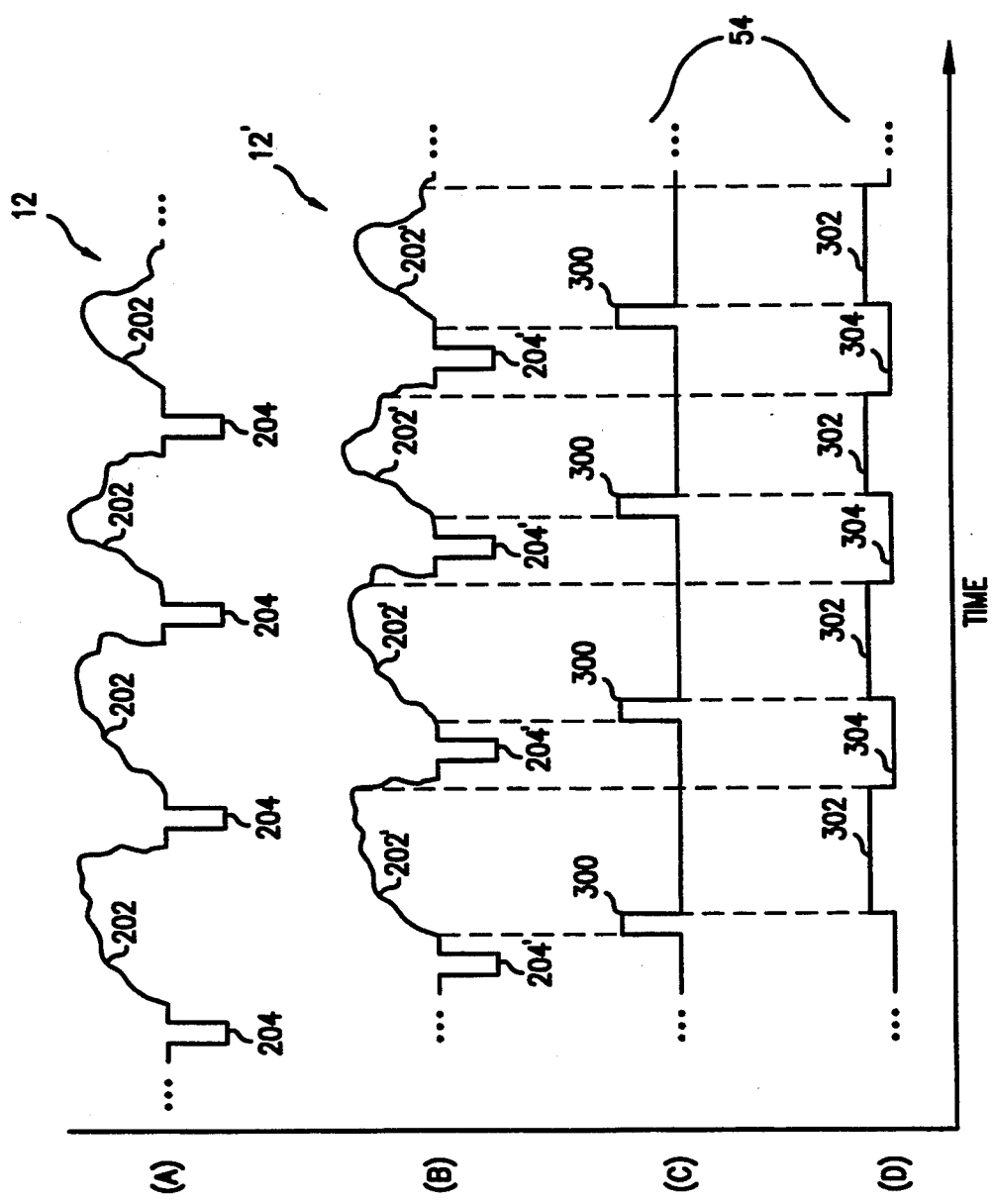
FIG. 4 is a timing diagram for the signal processor embodiment shown in FIG. 1.

In the embodiment of the present invention, the timing signals 54 from the timing section 30 determine when the carrier burst 34 is transmitted. A typical timing signal diagram for the timing signals 54 used to transmit the carrier burst 34 is shown in FIG. 4. FIG. 4(a) shows a positive primary color video signal 12 which is provided to the transmitter 10 (see FIG. 1). As the primary color video signal 12 is processed, the signal is delayed. These delays result in a time delayed primary color video signal 12' as shown in FIG. 4(b) at the output of the video section 20. The only differences between the original signal 12 and signal 12' is the time delays, introduced by the various processing blocks, and the filtering performed to allow for injection of the secondary data signal 49 into the primary color video signal 12'.

FIGS. 4(c) and 4(d) show that the timing signals 54 are comprised of the carrier enable pulses 300 and the injection control pulses 302 used in the embodiment of the present invention. As shown in FIG. 4(c), the beginning of the carrier enable pulses 300 correspond with the end of the blanking interval 204' and the beginning of the active portion 202' shown in FIG. 4(b). The carrier enable pulses 300 are used by the modulator 56 to transmit an unmodulated secondary signal carrier burst. Typically, the carrier burst begins when the carrier enable pulse 300 is received by the modulator 56, and the carrier burst lasts until an end of the carrier enable pulse 300 is detected. In an embodiment, the carrier enable pulses 300 last for at least five cycles of the secondary signal carrier of 4.197 Mhz or 1.2 μs to gate the carrier burst 220 from the carrier generator 35 to the modulator 56. However, different durations for the carrier burst may be used and the carrier burst may be provided by the analog data converter; in which event a gate signal may be eliminated by inserting into the data stream an extra logical level one at the start of each active interval so the carrier is always available at the start of each active video interval. The carrier burst helps maintain synchronization and may reduce errors, for instance, when a transmitter switches between primary video signals, for example, between a television show and a plurality of commercials.

The injection control pulses 302 shown in FIG. 4(d), like the carrier enable pulses 300, are generated by the 449 interface/rasterizer 51. The injection control pulses 302 are used by the modulator 56 to gate and properly synchronize the injection of the rasterized, packetized secondary signal into the primary color video signal 12' for subsequent transmission. The injection control pulses 302 remain low throughout the blanking interval 204', and while the carrier enable pulses 300 gate the carrier burst 220 to the adder 70. In the preferred embodiment, the injection control pulses 302 last for at least 220 cycles of the secondary signal carrier of 4.197 Mhz or 52.3 μs. However, different durations for the injection pulses may be used. Further, the data in the secondary signal is typically injected at the rate of 1 bit for every 7 cycles of the secondary signal carrier. However, different ratios of bits to the number of cycles of the secondary signal carrier are possible.

Injection of the secondary signal 49 normally ends with a guard period 304 at the end of the injection control pulse 302. As shown in FIG. 4(d), the beginning of the guard period 304 precedes to the beginning of the front porch to minimize interference with the blanking interval 204'. The guard period 304 of the secondary signal in the composite video signal will normally start at least 5 cycles of the 4.197 Mhz secondary signal carrier or about 1.2 μs prior to the end of the active portion 202' of the primary signal 12' to provide a sufficient guard period 304. However, other time durations and number of cycles for the start of the guard period may be used.

Figure 2:
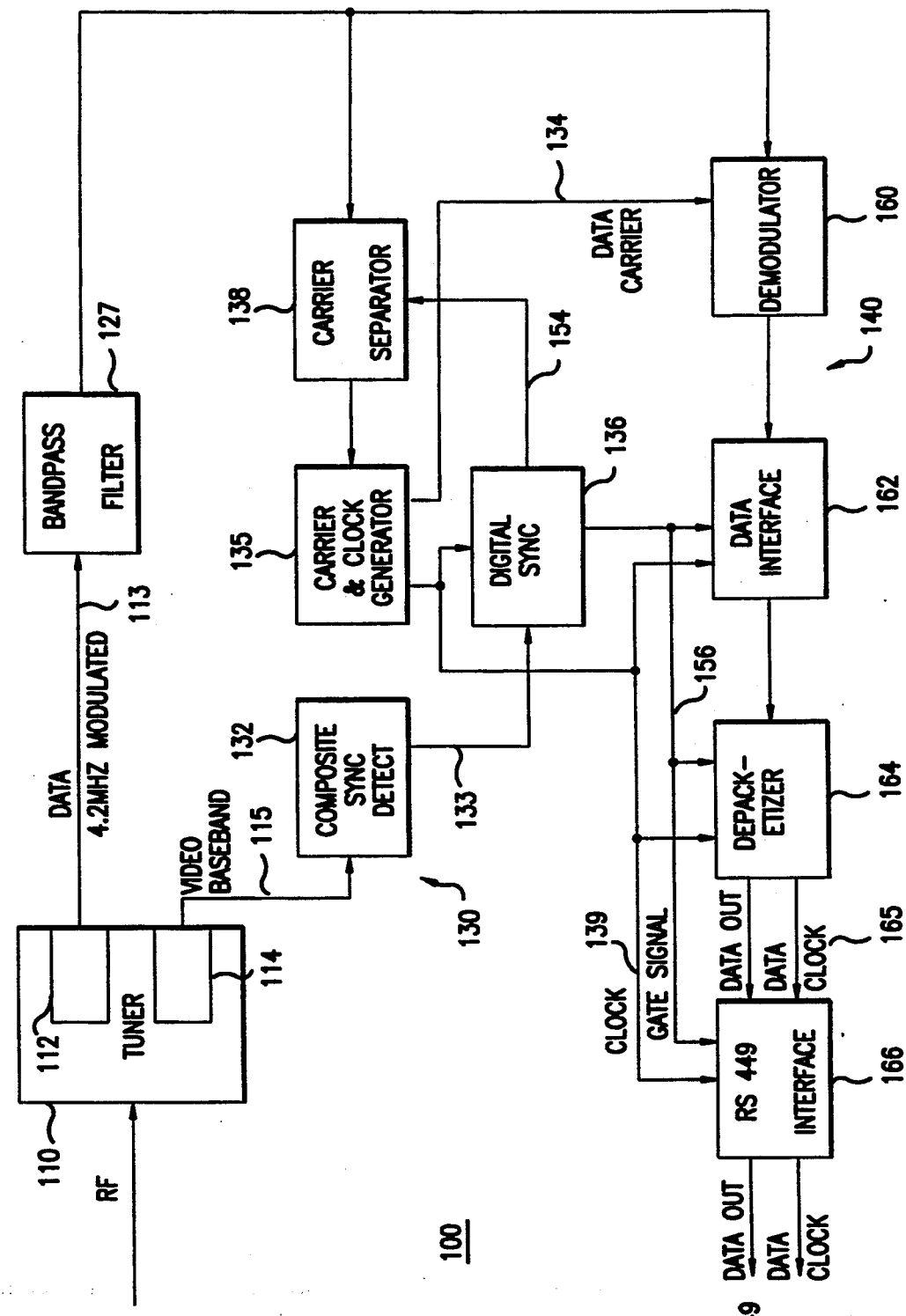
FIG. 2. is a block diagram for a signal processor incorporating an embodiment of the present invention for use in a receiver.

The processor embodiment of FIG. 2 is virtually identical to the receiver processor embodiment in FIG. 4 of U.S. patent application Ser. No. 07/947,134 to Montgomery et al. filed Sep. 18, 1992, and the description of that embodiment on pages 23 through 28 is incorporated herein by reference. In the embodiment of FIG. 2, the secondary data is received by a tuner 110 and output as the secondary signal 49 from a data section 140, which is controlled by a timing section 130.

In the present invention, the tuner 110 splits the composite video signal into the primary color video signal and the secondary signal. The baseband video section 114 provides a baseband video signal 115 that includes from about DC to 2.0 Mhz and may include the entire baseband video and audio signal if it is to be provided to an ordinary television (not shown). The baseband video signal 115 corresponds to primary color video signal of FIG. 4(b). The data section 112 of the tuner 110 outputs a modulated 4.197 Mhz signal 113 of data with the unmodulated carrier burst. The data signal 113 corresponds to the input to adder 70 from the modulator 56 in FIG. 1.

In the present invention, the timing section 130 includes a composite sync detector 132 that detects the horizontal and vertical sync signals in the baseband video signal 115 for synchronizing the timing section 130 to the received video signal. A carrier separator 138 detects the carrier burst 220 and provides phase synchronization between the receiver 100 and a transmitter (such as shown at 10 in FIG. 1). To accomplish this synchronization, the carrier separator 138 is enabled by a digital synchronizer 136 through a timing control signal 154 at the beginning of each active portion of the horizontal line in the primary video signal 115 as detected by the composite sync detector 132. The carrier separator 138 then detects the transmitted unmodulated carrier burst for synchronization and reduction of transmission errors.

In the preferred embodiment, the carrier separator 138 provides a phase control signal to the carrier generator 135. This signal causes the phase of the data carrier 134 in the receiver to be synchronized to the phase of the data carrier in the transmitter (such as shown at 10 and 34 in FIG. 1), such that the two data carrier frequencies are locked. The phase and frequency lock may be accomplished in the same manner that the color subcarrier in a conventional receiver may be synchronized to the color subcarrier in the transmitter. The carrier generator 135 uses the synchronized carrier to generate a clock signal 139 which may be used by the data section 140 to output the demodulated and unrasterized secondary data signal 49.

After the carrier burst has been received and ended, the output of a band pass filter 127, passing the band containing the data signal, is demodulated by the demodulator 160, and depacketized by a depacketizer 164. If the color burst was provided according to the alternative method of adding an extra logical one in the analog data converter 57 of FIG. 1, the data interface 162 ignores this first one at the start of the data from each horizontal line in response to the appropriate gate signal 156 and the clock 139 provided by the digital sync 162. After depacketizing the signal is provided to a RS 449 interface 166 for output as the demodulated and unrasterized secondary signal 49.

By using the techniques discussed above for the embodiments in FIGS. 1 and 2, data transmission rates in excess of 400 kilobits per second may be attained. By resorting to quadrature amplitude modulation, a T1 data rate or higher may be obtained. Other embodiments of the present invention may transmit data in another video format, such as SECAM or PAL.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

I claim:

1. A processor for combining a primary color video signal having active video lines separated by blanking intervals, and having a color burst with a secondary signal for subsequent transmission, the processor comprising:
   a primary signal section providing the primary color video signal having active intervals and blanking intervals;
   a secondary signal section generating a secondary signal carrier at a frequency of a predetermined number of cycles per second for providing a carrier burst and being modulated by a rasterized version of the secondary signal for injecting into the primary color video signal; and
   a timing section for generating at least one timing signal to control the injection of the carrier burst into the primary color video signal for a predetermined time period such that the injection of the burst and the rasterized data is halted a predetermined period before each blanking interval.

2. A processor according to claim 1, wherein the primary color video signal blanking intervals include horizontal blanking intervals, and wherein the carrier burst is injected into the primary color video signal immediately after at least some horizontal blanking intervals.

3. A processor according to claim 1, wherein the horizontal blanking interval has a front porch and a back porch, and wherein the carrier burst is injected into the primary color video signal during one of the front porch and the back porch.

4. A processor according to claim 2, wherein each horizontal blanking interval has a back porch having an end during which a color burst is generated, and wherein the carrier burst is injected into the primary color video signal after the color burst and before the end of the back porch.

5. A processor according to claim 1, wherein at least one timing signal controls the carrier burst to last for a predetermined number of the secondary signal carrier cycles.

6. A processor according to claim 5, wherein the active video lines each have an end, and wherein the secondary signal is injected into the primary color video signal until the end is a predetermined number of cycles of the secondary signal carrier away.

7. A processor according to claim 6, wherein the primary color video signal conforms to an NTSC standard.

8. A processor according to claim 6, wherein the primary color video signal conforms to a PAL standard.

9. A processor according to claim 6, wherein the primary color video signal conforms to a SECAM standard.

10. A processor according to claim 1, wherein the primary color video signal has a horizontal scanning frequency, and wherein the secondary signal is injected into the primary color video signal at a non-integral, odd quarter multiple of the horizontal scanning frequency.

11. A method of combining a primary color video signal with a secondary signal for subsequent transmission, the method comprising the steps of:
providing a primary color video signal having active video lines separated by blanking intervals;
generating a secondary signal carrier having a frequency with a predetermined number of cycles per second and a secondary signal carrier burst;
producing at least one timing signal based upon at least some of the blanking intervals in the video signal;
injecting in response to the timing signal the carrier burst of the secondary signal carrier for subsequent transmission into the active video lines;
modulating and rasterizing the secondary signal with the secondary signal carrier for injection into the primary video signal; and
injecting the secondary signal only during the active video lines when the carrier burst is not being injected into the primary video signal to form a composite signal for subsequent transmission after subsequent transmission of the carrier burst.

12. A method according to claim 11, further comprising:
providing the primary color video signal with a horizontal blanking period as one of the blanking intervals; and
injecting the carrier burst into the primary color video signal after at least some of the horizontal blanking intervals.

13. A method according to claim 11, further comprising:
providing the horizontal blanking period with a back porch;
generating a color burst during the back porch; and
injecting the carrier burst into the primary color video signal immediately after the back porch.

14. A method according to claim 13, further comprising:
injecting the carrier burst into the primary color video signal for at least five cycles of the secondary signal carrier.

15. A method according to claim 12, wherein the primary color video signal has active video lines with ends; and
injecting the secondary signal into the primary color video signal until a predetermined period prior to the end of the active lines of the primary color video signal.

16. A method according to claim 15, wherein the primary color video signal is according to an NTSC standard.

17. A method according to claim 11, further comprising:
providing the primary color video signal with a horizontal scanning frequency; and
injecting the secondary signal into the primary color video signal at a non-integral, odd quarter multiple of the horizontal scanning frequency.

18. A method according to claim 11, further comprising
using a receiver to receive the subsequently transmitted primary color video signal with the carrier burst.

19. A method for injecting a secondary signal carrier burst into a color video signal, the method comprising:
providing a color video signal having active lines and blanking intervals at a predetermined rate with a horizontal blanking period with a front porch and a back porch in at least some blanking intervals and having a color carrier burst on the back porch;
generating a tertiary carrier having a frequency and timing signals based upon the rate of at least some of the blanking intervals; and
injecting the secondary carrier burst into the primary color video signal in response to at least one of the timing signals during one of the front porch and the back porch.

20. A processor for a receiver for receiving a composite video signal which includes a primary color video signal having blanking intervals separating lines of active video and at least one other carrier, each carrier having a frequency and having a secondary rasterized modulated signal modulated with a carrier having a different frequency, the processor comprising:
a primary section for receiving the composite video signal and providing at least one timing signal based upon the rate of at least some of the blanking intervals; and
a secondary signal section for receiving a secondary signal including a carrier burst at the different frequency in the composite video signal, detecting the carrier burst in response to the timing signal, and providing a demodulated unrasterized version of the secondary signal after a detection of the carrier burst.

21. A processor for combining a primary color video signal with a secondary signal for subsequent transmission, the processor comprising:
a primary signal section providing the primary color video signal having active video lines separated by blanking intervals, the start of the blanking interval defining the end of the active video lines, and having a color carrier having a frequency;
a secondary signal section having a secondary signal carrier at a different frequency of a predetermined number of cycles per second for providing a secondary signal carrier burst and a modulation signal produced by the modulation of the secondary signal carrier modulated with a rasterized version of the secondary signal for injection into the primary color signal; and
a timing section producing a timing signal for halting the injection of the modulated secondary signal when the end of the active video line is a predetermined number of cycles of the secondary signal carrier away.

22. The processor of claim 21, wherein the predetermined interval is equal to about five cycles.

23. The processor of claim 21, wherein the timing section produces a timing signal controlling the injection of the carrier burst into the video signal so that a predetermined number of cycles is injected into the video signal immediately after the end of each blanking interval.

* * * * *